United States Patent [19]

Phillips

[11] Patent Number: 5,638,589

[45] Date of Patent: Jun. 17, 1997

[54] SHOELACE AND METHOD OF MAKING THE SAME

[76] Inventor: Edwin D. Phillips, 170 Albert St., North Plainfield, N.J. 07060

[21] Appl. No.: 13,401

[22] Filed: Feb. 4, 1993

[51] Int. Cl.⁶ .................................................. A43C 9/00
[52] U.S. Cl. ........................... 24/715.4; 24/713; 24/715.6
[58] Field of Search ........................... 24/715.4, 715.5, 24/715.6, 715.7, 713, 713.1, 712, 712.1, 712.2, 306; 36/50.1, 2 R, 87

[56] References Cited

U.S. PATENT DOCUMENTS

| | | | |
|---|---|---|---|
| 579,943 | 3/1897 | Kempshall | 24/715.4 |
| 819,946 | 5/1906 | Stirckler | 24/715.4 |
| 1,483,052 | 2/1924 | Matson | 24/715.4 |
| 1,586,473 | 5/1926 | Rose | 24/715.6 |
| 2,477,151 | 7/1949 | Stapleton | 24/713 |
| 2,646,630 | 7/1953 | Miller | 24/715.4 |
| 2,898,631 | 8/1959 | Jeffery . | |
| 3,581,353 | 6/1971 | Sonntag | 24/715.4 |
| 3,664,915 | 5/1972 | Gore . | |
| 3,953,566 | 4/1976 | Gore . | |
| 3,962,153 | 6/1976 | Gore | 264/210 R |
| 4,304,245 | 12/1981 | Lichfield . | |
| 4,339,499 | 7/1982 | Tappe et al. . | |
| 4,429,078 | 1/1984 | Cogswell et al. | 525/165 |
| 4,433,083 | 2/1984 | Cogswell et al. | 524/27 |
| 4,450,849 | 5/1984 | Cerceo et al. . | |
| 4,496,507 | 1/1985 | Okita et al. . | |
| 4,651,447 | 3/1987 | Sullivan | 24/715.4 |
| 4,776,358 | 10/1988 | Lorch . | |
| 5,023,982 | 6/1991 | Mehan | 24/715.4 |
| 5,033,488 | 7/1991 | Curtis et al. . | |
| 5,038,805 | 8/1991 | Lee . | |
| 5,063,948 | 11/1991 | Lloyd . | |
| 5,099,552 | 3/1992 | Kimbrough | 24/715.6 |

FOREIGN PATENT DOCUMENTS

| | | | |
|---|---|---|---|
| 0244934 | 12/1925 | United Kingdom | 24/715.4 |
| 0369519 | 3/1932 | United Kingdom | 24/715.3 |

*Primary Examiner*—Victor N. Sakran
*Attorney, Agent, or Firm*—Shoemaker and Mattare, Ltd.

[57] ABSTRACT

A soft, expanded shoelace is extruded from a PTFE paste. Its ends are permanently hardened by laterally compressing the lace, and terminations are installed on the ends.

7 Claims, 2 Drawing Sheets

SHOELACE AND METHOD OF MAKING THE SAME

BACKGROUND OF THE INVENTION

This invention relates to shoelaces.

Most shoelaces nowadays, other than leather laces, are made by braiding or knitting natural or synthetic yarns. Good laces have high bendability, and good strength and abrasion resistance. The ability to receive dyes is important as well. As with any cordage, shoelaces should hold a knot well, yet must untie easily, whether wet or dry.

While traditional shoelaces are amply suited to their intended task, there remain avenues for improvement. For example, it would be desirable to have a laces which did not absorb water, and lacked interstices in which soil may lodge. Such a lace would be expected to stay clean longer, and to retain its knotting and untying characteristics in rain and snow. It would also be good to have a particularly soft shoelace, both for purely aesthetic reasons and for added comfort. Strength should not be compromised in order to obtain softness, however.

From a manufacturing standpoint, it would be convenient not to have to weave or knit yarns to produce shoelaces. If the surface were continuous, rather than interrupted by yarn interfaces, detailed surface printing or other ornamentation would be possible. To produce shoelaces by extrusion would be simplicity itself, and could be expected to produce consequent economies.

Finally, a shoelace having a novel look and feel could be aesthetically attractive.

SUMMARY OF THE INVENTION

An object of the invention is to provide an easily manufactured shoelace having excellent strength, durability, and soil resistance.

A second object is to produce a waterproof shoelace having a sufficiently high coefficient of friction to remain knotted once tied and yet be easily untied.

Another object of the invention is to produce an attractive lace in a variety of colors.

A further object of the invention is to make a shoelace having an unusual and pleasant feel.

These and other objects are attained by a shoelace produced by extruding a PTFE paste through an orifice cutting the extrudate to lengths and then terminating the ends of each length by compressing it laterally until hard and then, optionally, installing a metal or plastic sleeve or tip over the compressed end.

One would think that PTFE would not be suitable for laces, since PTFE is notoriously well known to have a low coefficient of friction. It ought to be impossible to keep such laces tied, and yet, I have found that knots formed in the inventive laces hold perfectly well.

BRIEF DESCRIPTION OF THE DRAWINGS

In the accompanying drawings.

DESCRIPTION OF THE PREFERRED EMBODIMENT

Figure 1:
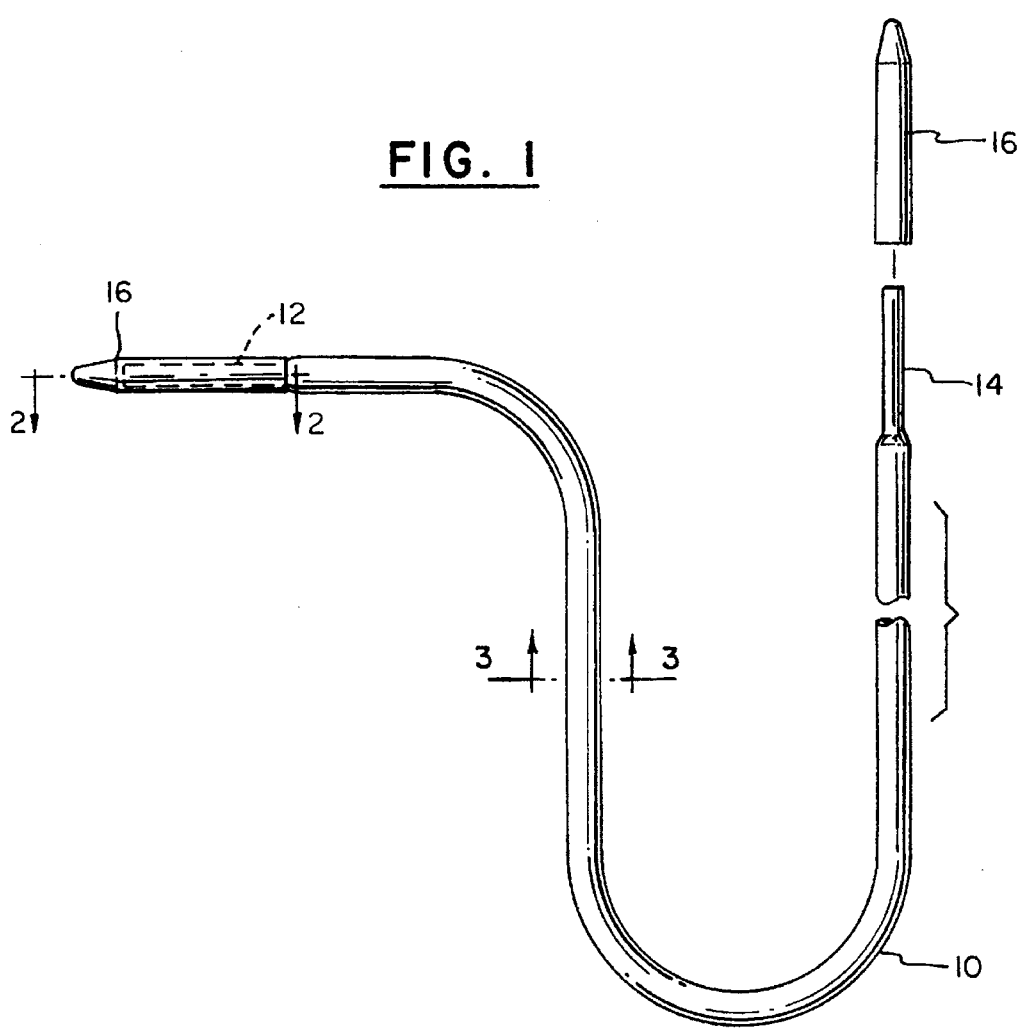
FIG. 1 is a plan view of a shoelace embodying the invention.
Figure 2:
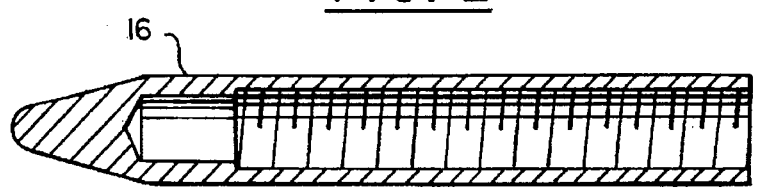
FIG. 2 is a sectional view of an end of the shoelace, taken on the plane 2—2 in FIG. 1.
Figure 3:
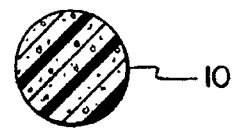
FIG. 3 is a cross-section taken on the plane 3—3 in FIG. 1.

A shoelace embodying the invention, as shown in FIGS. 1-3, comprises a soft, cylindrical body 10 which is cut from an indefinite length of polytetrafluoroethylene (PTFE, or "Teflon") material extruded through a circular orifice under substantial pressure. Except for the lace's ends 12 and 14, the cross-section of the body, shown in FIG. 3, is generally uniform, although it may be possible to emboss the surface of the body for decoration. The ends themselves have been permanently reduced in diameter by squeezing them between the jaws of a press, which renders them hard, like solid PTFE. I prefer to use jaws which will give the hardened end a square cross-section, best seen in FIG. 4. The thus-compressed lace ends may be satisfactory alone; however, I prefer to add separate terminations, such as the round-nosed metal tips, or plastic ferrules.

The hollow metal tip 16 shown in FIG. 2 is generally bullet-shaped, and has an internal diameter slightly less than that of the hardened lace end 12 or 14. The tip is internally threaded, and the hardened lace end is correspondingly threaded, so that the tip can be installed by screwing it onto the lace end.

Figure 4:
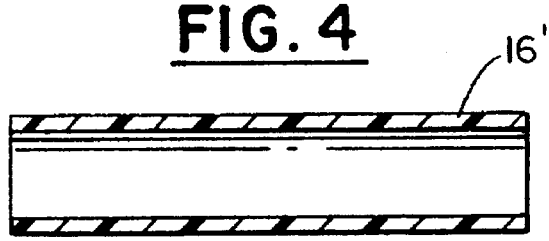
FIG. 4 is a view, corresponding to FIG. 2, of a second embodiment of the invention.

In the alternative embodiment of FIG. 4, a plastic sleeve 16', about an inch long, is installed over the lace end. The sleeve is preferably heat shrink tubing, which is shrunk around the already compressed lace end by heating with hot air or other means. As it shrinks, the sleeve conforms to the cross-section of the lace end, which is considerably harder.

The extrusion process, which is based on the well-known "Gore" process, produces an expanded structure of longitudinally-extending fibers. The expansion is so great that the laces have a very "soft" feel, because they are very compressible in a direction perpendicular to their length; however, they are not particularly stretchable lengthwise. Additionally, they are quite strong, having considerably more tensile strength than cotton laces of like dimensions.

A preferred method of making the lace material is as follows. A commercially available grade of fine PTFE powder paste extrusion resin is mixed with 15–22% naphtha ("V&P", deisgnating high purity) or Isopar (an extrusion aid), and the pressed at 500–1000 psi into a preform which is extruded with a paste extruder. The extrudate is then dried in an oven at 300° F. to remove most of the extrusion aid. Following this, the product is stretched 120%–1200%, preferably 200% to 300%, while being passed through a heating chamber containing steam at 800° to 100° F. that heats the material to soften it and "lock in" the expansion. Expansion occurs during stretching, as the result of fibrules being stretched from nodes.

To reduce surface shredding, I prefer to adjust the feed rate and chamber temperature so that the surface fibrules are unified just prior to exiting the chamber. As the lace material exits the chamber, a mist of water and air is applied to cool the product rapidly. Tension is completely removed within a few feet of the oven exit, to relax the product, before winding it onto a spool.

While the extruded material does not absorb water, dyes can be mixed into the slurry. Thus, a variety of solid colors can be produced. The material will absorb certain liquids, such as oil, so it should be possible to imprint the laces with various designs. Or, as mentioned above, the material surface may be embossed. In either event, the surface of the lace is much smoother than a fabric lace, so that more detailed designs may be applied and discerned.

As shown in FIG. 1, both ends of the lace have been compressed in a press to form a hard, much more slender terminal portion preferably having a square cross-section. The lace end is then externally threaded by an known means, and the internally threaded tip is then screwed on. It would also be possible to crimp the tip, or attach it with suitable adhesives.

The hardened lace end, even when not covered with a termination, is permanently set and does not tend to return to its former expanded diameter. But in the remainder of the lace, minor lateral forces such as occur in knots formed in the lace, disappear in a while after pressure is released. The laces thus tend to retain a "new" geometry.

The softness of the laces is an aesthetically attractive feature of the invention; and because the lace flattens out under the shoe's eyelets, it is more comfortable than other round laces, like rawhide.

Another advantage of the invention is that the laces do not absorb water; hence, they resist soiling and do not get soggy, tight or heavy in the rain. This makes them ideal for use as boot laces. Additionally, the imperviousness to water makes the laces especially sanitary, and thus attractive to medical environments (e.g., laces for medical personnel).

While the invention has been described as a shoelace, there are other applications, such as for drawstrings, eyeglass retaining straps and so on. The claims are intended to describe the product, regardless of the use to which it is put.

Figure 7:
FIG. 7 is a view like FIG. 3, of an alternative lace.

The geometric form of the invention may be changed from that described above. For example, while a round lace cross-section is presently preferred, non-circular cross-sections may be produced by extruding through appropriately shaped orifices. FIG. 7, for example, depicts a lace having a rectangular cross-section, which results from extruding a wide ribbon of material through a slit, and then cutting the ribbon lengthwise to form a plurality of laces.

Figure 6:
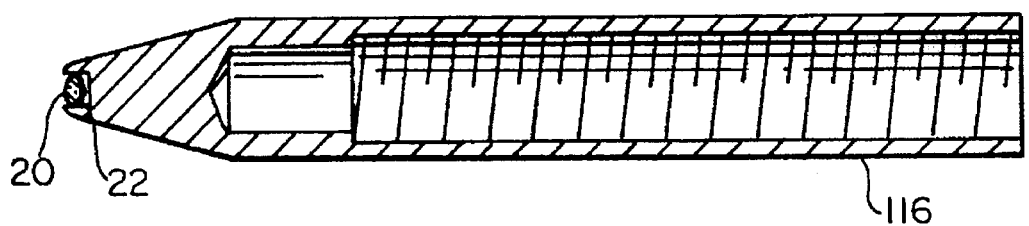
FIG. 6 is a modified lace tip in cross-section.
Figure 5:
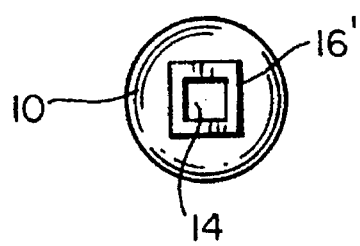
FIG. 5 is an end view of the lace shown in FIG. 4.

Additional ornamentation may be added to the body of the lace by printing or embossing as mentioned above. It is also contemplated to set a decorative jewel 20 in a recess 22 formed in the tip of the termination 116, as shown in FIG. 6.

Since the invention is subject to modifications and variations, it is intended that the foregoing description and the accompanying drawings shall be interpreted as illustrative of only one form of the invention, whose scope is to be measured by the following claims.

I claim:

1. A shoelace comprising a body consisting essentially of a single strand of expanded PTFE formed by extruding PTFE extrusion resin through an orifice, then stretching the strand lengthwise 120% to 1200%, wherein the body terminates at hardened tips formed by laterally compressing ends of the shoelace in a press.

2. The shoelace of claim 1, wherein each hardened tip has a square cross-section.

3. The shoelace of claim 1, further comprising a sleeve-like termination installed upon each tip.

4. The shoelace of claim 3, wherein each termination has a rounded nose.

5. The shoelace of claim 4, wherein each termination is internally threaded, and is screwed onto the respective lace tip.

6. The shoelace of claim 3, wherein each termination is a sleeve having two open ends.

7. The shoelace of claim 6, wherein the sleeve is made of a heat shrinkable material, and is shrunk onto the hardened tip of the lace.

* * * * *